United States Patent Office 3,276,210
Patented Oct. 4, 1966

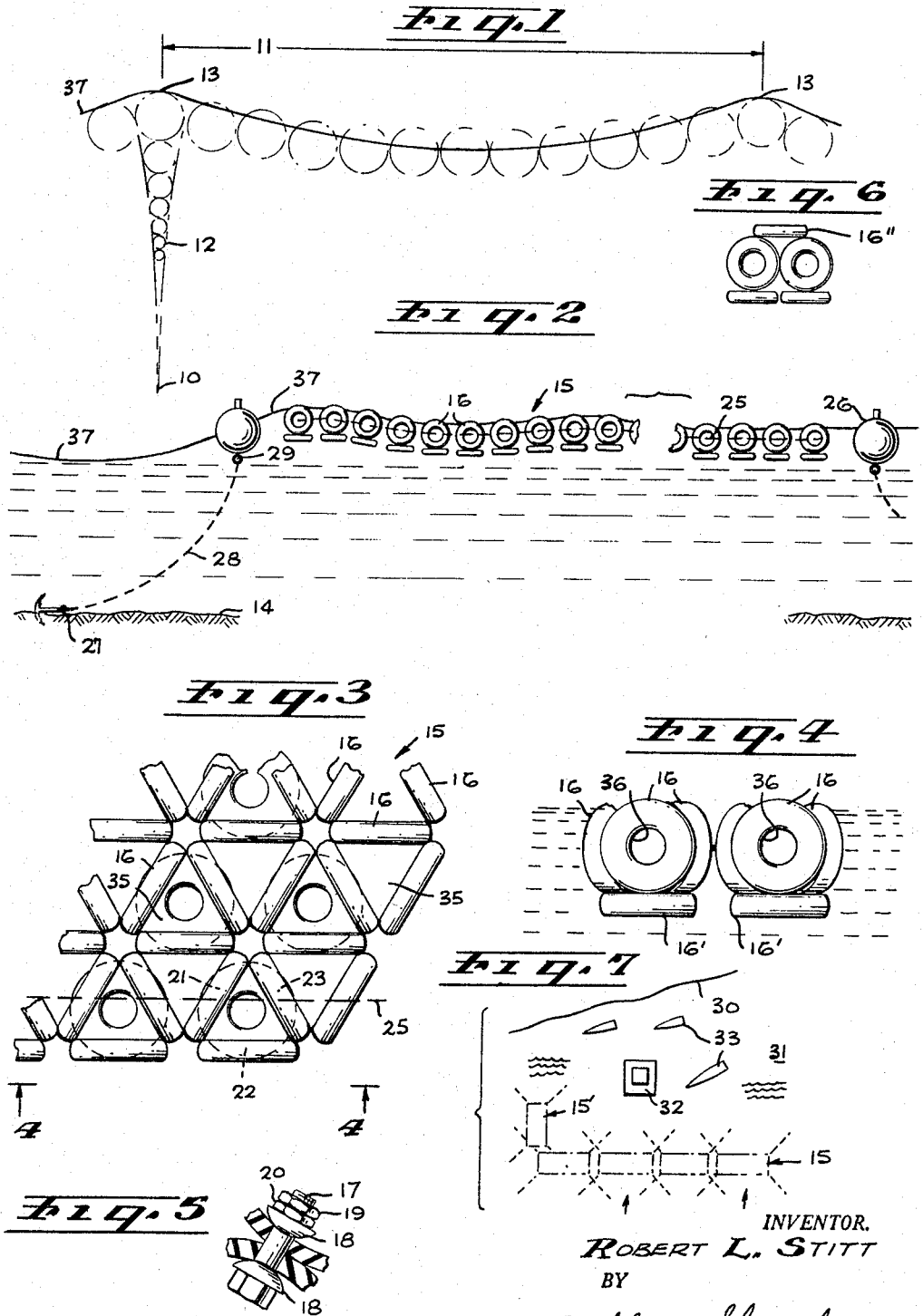

3,276,210
BREAKWATER
Robert L. Stitt, 10732 E. Freer St., Temple City, Calif.
Filed June 6, 1963, Ser. No. 285,981
7 Claims. (Cl. 61—5)

The invention relates to breakwaters and has special reference to a segmented breakwater which can be built in sections and then towed to its proper location where it may be affixed in position either as a floating breakwater or, under certain circumstances, sunk in place to serve as a sunken breakwater.

To understand the efficacy of the sectional breakwater here under consideration, attention is invited to certain known characteristics of waves and wave form which are taken advantage of in the design of the breakwater here disclosed.

Having reference to waves generated at sea, it is known that waves start up by reason of friction or frictional drag created by wind. As the wind starts and gradually increases small waves are first generated where water absorbs the energy of the wind and small waves gradually build up into larger waves and the wave pattern progressively approaches the shore or other area which needs to be guarded against by employment of a breakwater.

As the result of studies recently made in connection with wave forms and wave energy, it has been determined that water particles making up a wave form travel in circular orbits. At the surface the diameter of these circular orbits equals the wave height. Below the surface at a depth equal to half the length of the wave the orbital diameter is only 4% of the orbital diameter at the surface. Therefore, to break up and dissipate wave energy in order to protect a mooring, a very substantial amount of protection can be achieved by having a breakwater extend below the surface to a depth not more than about one-half the wave length. This means that to have an effective breakwater where the depth of the water exceeds a distance equal to one-half the wave length, the breakwater would not necessarily have to reach the bottom formation. Further still, because the energy of waves progressively diminishes so rapidly at points below the surface, a desirable breakwater effect could readily be achieved even where the breakwater structure extends downwardly below the surface to a depth appreciably less than one-half the wave length. In other words, except near shore, the bottom has little or no effect upon waves.

Another contributing factor in the design of an effective breakwater is the fact that as waves approach shore and reach shallower water the depth becomes less than one-half their wave length. The ultimate effect of this is for the bottom to refract the waves and to turn the wave fronts to approximately the shape of the bottom structure contour. Therefore, near shore this turning effect of the wave front results in waves near the shore being substantially parallel to the shore line. Accordingly, for a breakwater to be effective off shore it should be extended in a direction parallel to the shore line which, for the reasons noted, would also be parallel to the waves and hence produce a maximum degree of protection within the breakwater. It will of course be understood that storm waves often are of considerable height and that it might not be possible to protect against exceptional conditions arising under especially stormy circumstances.

Even stationary breakwaters of great mass, however, extending upwardly from a bottom formation do not afford perfect protection when waves are so high that they break over the breakwater.

It is therefore among the objects of the invention to provide a new and improved breakwater structure capable of destroying a substantial amount of wave energy in a gradual fashion by progressively dissipating the energy as contrasted with a breakwater effect achieved by sheer force.

Another object of the invention is to provide a new and improved sectional type breakwater which can be towed into position and there secured to the bottom structure in the most advantageous location for a given set of circumstances.

Still another object of the invention is to provide a new and improved floating-type sectional breakwater capable of being used at sea as well as in positions off shore.

Still another object of the invention is to provide a new and improved sectional type breakwater which can be used either as a floating breakwater or as a sunken breakwater depending upon particular conditions which may be encountered, the breakwater being of such character that it can be made as large or as small as may be needed for a given set of circumstances.

Still another object of the invention is to provide a new and improved sectional type breakwater, the sections of which can be readily constructed on shore and then launched and moved into positions as desired.

Further included among the objects of the invention is to provide a new and improved flexible type structure for a breakwater and particularly a floating breakwater which under no circumstances is a navigation hazard either when anchored in place or under conditions where the breakwater might break loose and temporarily float about out of control.

Also included among the objects of the invention is to provide a new and improved movable sectional-type breakwater capable of being fabricated of inexpensive material and also which is of flexible, inexpensive construction not only easy to build but also easy and inexpensive to maintain.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:
FIGURE 1 is a schematic cross-sectional view showing a cross-section of an ocean wave.
FIGURE 2 is a cross-sectional view showing the effect of the breakwater upon ocean waves.
FIGURE 3 is a fragmentary plan view showing a portion of the breakwater structure.
FIGURE 4 is a fragmentary side elevational view taken on the line 4—4 of FIGURE 3.
FIGURE 5 is a fragmentary sectional view showing a detail of attachment of segments forming the structure.
FIGURE 6 is a fragmentary elevational view somewhat similar to FIGURE 4 but showing a slightly deeper breakwater structure.
FIGURE 7 is a diagrammatic plan view showing the manner in which sections of the breakwater may be used.

In an embodiment of the invention chosen for the purpose of illustration the breakwater is described in a form applicable to use in protecting against ocean waves. It will be understood, however, that the structure is not limited to use of this kind in that the principles inherent in it render the structure also applicable for flood control in river and inland waters as well. In accordance with what is currently known about the depth to which wave ocean extends, FIGURE 1 shows that at a point 10 which is about one-half of the wave length indicated by the reference character 11, wave energy no longer exists and hence there is no wave motion at this depth. Even at a point 12 halfway between the point 10 and a crest 13 of the wave, there is only a small fraction of the wave energy present as compared to the wave energy at the surface. Therefore, to provide a breakwater the effect of which would be appreciable, it is not necessary that the structure of the breakwater extend deeper than the point 10, and indeed a very creditable protection can be expected with a breakwater structure which goes no deeper than the point 12 or even one which is still shallower.

The invention here under consideration is directed to a flexible permeable structure which is intended to gradually and successively dissipate wave energy near the surface rather than to provide a positive blocking effect to stop wave energy absolutely as would be expected of a solid structure fastened to a bottom formation 14. To accomplish this a breakwater structure indicated generally by the reference character 15 irrespective of its length should have a breadth several times the wave length 11. The breadth can of course depend upon the degree of protection desired since it would in all probability not be feasible to make the breadth so great as to be a positive assurance against the highest storm waves which might be experienced. It is sufficient for practical purposes to provide relatively quiet water for most circumstances which are ordinarily encountered and this can be accomplished by a breakwater of such breadth that as the wave length progressively shortens in its travel from one side of the breakwater structure to the other, its height will be progressively lowered and its energy progressively diminished as the wave length shortens prior to its emergence on the lee side of the breakwater.

The physical structure here under consideration consists of the employment of a multiplicity of individual units of open construction fastened together by appropriate means. Such a unit of practical advantage has been found to exist in automobile tires 16 in the arrangement illustrated. Automobile tires may be of worn and discarded type no longer useful for the original purpose and accordingly available as scrap, or even discarded trash at specially low cost. Other resilient vehicle tires of large size may be even more acceptable.

A successful arrangement of such units is illustrated in FIGURE 3 and 4. In this form the tires are arranged vertically in groups of three with edges of each of the three in respective tangential contact with the next two adjacent edges thereby to constitute wall-forming members of each unit. The selection of a threefold unit is advantageous in that such units are multiples of a hexagonal structure which from the point of view of geometry produces substantially a maximum amount of area covered by the structure with employment of substantially a minimum number of units.

The tires at their points of tangency may be secured to each other by means of bolts 17 over which rounded washers 18 are placed and secured in position by a nut 19 and locknut 20, although other manner of fastening may also be made use of. Employment of rounded washers like the washers 18 is helpful in that it minimizes wearing at the joint. It is preferable also that the nuts be not drawn too tightly so that the joint has a substantial degree of flexibility, thereby permitting the entire structure to yield appreciably when the need arises.

To aid in the stability of the structure as a whole it is advisable to employ additional tires at the locations 16′ where edges of these also fall into tangential engagement with the corresponding edges of the vertically disposed tires 16. The tires at the location 16′ should also be secured at points 21, 22 and 23, for example, to the vertically disposed tires 16 by the same nut and bolt type joint illustrated and described in connection with FIGURE 5. Further still, as shown in FIGURE 3, the triangular effect of the vertically disposed tires 16 is repeated so that the triangular effect of one unit forms part of the triangular structure of the immediately adjacent units thereby to build up the composite structure, the fastening means in each instance being one made in accordance with the description associated with FIGURE 5 or other appropriate fastening medium.

Because in the arrangement suggested it is not possible to place a horizontally disposed tire at the location 16′ beneath each triangular arrangement of vertically disposed tires open spaces are left between the tires at the positions 16. The structure can be strengthened if desired by placing horizontally disposed tires at locations 16″, namely on the upper side of the structure as indicated in FIGURE 6, these being fastened by the same nut and bolt arrangement described in connection with FIGURE 5. The structure according to FIGURE 6 has the additional advantage of extending to a greater depth than the construction of FIGURE 4 where a greater depth is advantageous. It will be appreciated, of course, that a still greater depth of structure can be made following the same technique as has just been described merely by attaching two tires both at the position 16′ and the position 16″ to the vertically disposed tires 16 in the relationship and arrangement already described in detail.

Although the fastening devices of FIGURE 5 are substantially reliable, it may be found desirable to extend a chain like the chain 25 entirely around the perimeter of the outermost triangular structures thereby to bind the structure together as a whole.

On those occasions where the structure is to be a floating breakwater in the position illustrated in FIGURE 2, floats 26 are provided at the corners. Should the circumstances be such, however, that in relatively shallow water the structure is better sunk to a position resting on the bottom structure 14, inexpensive weighting such as concrete can be placed in the tires to cause them to sink to the bottom.

In the floating arrangement, however, it becomes necessary to anchor the structures 15 in position. This can readily be accomplished by a conventional anchor 27 from which a conventional anchor chain 28 with proper lead or scope extends upwardly to a ring 29 at the bottom of the float 26 in each instance. For effective anchoring there should be an anchor at each corner as indicated in FIGURE 7, with the anchor at the respective corner extending diagonally outwardly to secure against movement in all directions in composite effect.

As shown in FIGURE 7, a series of structures 15 may be anchored end-to-end off shore from a shore line 30. Since the direction of waves is normally perpendicular to the shore, by extending a sufficient number of the structures parallel to the shore a sheltered area 31 can be provided. If need be, of course, additional structures can be anchored at one or both ends as illustrated by way of example by the structure in the position 15′. It will further be understood that to provide shelter for an object like a tower 32 or an anchorage for boat like boats 33, the breakwater structures could just as readily be anchored in deep water without respect to the location of the shore line 30.

Irrespective of where the breakwater structures may be located, it will be understood that what is especially advantageous is the provision of a maze of spaces like the spaces 35 intercommunicating by means of spaces 36 forming the hollow midportions of the end tires 16. The maze thus formed and of appreciable breadth, several times the wave length, causes a turbulence at a surface 37 of the water and below the surface for at least the depth of the structure thereby to break up the orbital movement of water particles. Even though the entire wave energy and height is not eradicated as the initial crest strikes the outermost edge of the breakwater structure, the height nevertheless will be lessened and the height of the wave as it rises to its next crest inwardly in its progress across the breadth of the structure will be lower and the energy correspondingly diminished still further. This progressive abatement of wave height and energy can be made to occur as often as need be to produce the desired degree of quiet water within the breakwater. It is of course possible, if desired, to make the breakwater structure of sufficient breadth to produce virtually level water at the lee side. Naturally since the surface of the water is a wave pattern across the breadth of the breakwater structure, the structure will need to yield and this is possible, first because of the resilient nature of the tires themselves and also because of the resilient interconnections of one tire with another throughout the structure.

Although one special arrangement of tires is shown, some being vertical and some being horizontal, it will be appreciated that the arrangement of toroidal units such as tires can be differently achieved as, for example, by placing them in a variegated horizontal pattern effect with interconnecting spaces to form a maze and thus, by providing a flexible structure forming a maze as suggested, a floating breakwater effect can be accomplished. In some occasions it may be preferable to employ only one layer of tires in horizontal position, as shown by the tires 16' of FIGURE 4, but tangent to each other so that they may be fastened together by the fastening means of FIGURE 5.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A breakwater structure adapted to be secured to a bottom formation for dissipating the energy of a succession of waves on a surface of water over said bottom formation, said structure comprising a multiplicity of individual generally planar units disposed in normally vertical edgewise positions and each having an opening for flow of water through the respectice unit, said units being arranged in a horizontal pattern defining a multiplicity of vertically opening spaces dispersed throughout said structure and each bounded by a group of said units, the adjacent units in each said unit group having points of engagement and each said unit group including units in common with the adjacent unit groups, respectively, yieldable connections joining the adjacent units at said points of engagement to form a unitary breakwater structure, whereby said structure is yieldable in horizontal and vertical directions, said structure being many unit groups in length and breadth, said spaces communicating through said unit openings to define a maze of tortuous interconnecting horizontal and vertical passages through said structure, flotation means operatively connected to said structure for sustaining said structure at and beneath the surface of said water, and anchoring means on opposite sides of said structure adapted to yieldably secure said structure to said bottom formation in a direction abreast of said succession of waves, whereby when said waves strike the side of said structure the structure is penetrated gradually by the waves and yields progressively whereby the height and energy of the waves is progressively absorbed from one side to the other of said structure.

2. A breakwater structure according to claim 1 wherein said units are constructed of a firm resilient material such as rubber, whereby the individual units are adapted to yield.

3. A breakwater structure according to claim 1 wherein said unit groups have upper and lower ends, additional units seating against one end of at least some of said unit groups, and yieldable connections joining said additional units to the units of their respective adjacent unit groups.

4. A breakwater structure according to claim 1 wherein each of said unit groups contains three units arranged in a triangular pattern in horizontal plan view whereby each of said spaces has a triangular shape in horizontal plan view.

5. A floatable breakwater structure adapted to be secured to a bottom formation for dissipating the energy of a succession of waves on a surface of water over said bottom formation, said structure comprising a multiplicity of individual units, earh said unit comprising a hollow annulus of firm resilient material, said units being positioned in edgewise vertical position and dispersed in a horizontal pattern, said units having points of engagement one with another and a yieldable connection at said points of engagement binding said units together to form said structure, said structure being yieldable in horizontal and vertical directions, said units forming a maze of interconnecting horizontal and vertical passages through the structure, said structure having a breadth substantially greater than the diameter of an individual unit and a depth greater than the diameter of a single unit, said structure including flotation means adapted to sustain said structure at and beneath said surface of water and anchoring means on opposite sides of said structure adapted to yieldably secure said structure to said bottom formation in a direction abreast of said succession of waves, whereby when said waves strike the side of said structure the structure is penetrated gradually by the waves and yields progressively whereby the height and energy of the waves is progressively absorbed from one side to the other of said structure.

6. A floatable breakwater structure adapted to be secured to a bottom formation for dissipating the energy of a succession of waves on a surface of water over said bottom formation, said structure comprising a multiplicity of individual units, each said unit comprising a hollow annulus of firm resilient material, some of said units being positioned in edgewise vertical position, others of said units being in a horizontal position and having points of tangential engagement one with another, and a yieldable connection at said points of tangential engagement binding said units together to form said structure, said structure being yieldable in horizontal and vertical directions, said units forming a maze of interconnecting horizontal and vertical passages through the structure, said structure having a breadth substantially greater than the diameter of an individual unit and a depth greater than the diameter of a single unit, said structure having flotation means adapted to sustain said structure at and beneath said surface of water, and anchoring means on opposite sides of said structure adapted to yieldably secure said structure to said bottom formation in a direction abreast of said succession of waves whereby when said waves strike the side of said structure the structure is penetrated gradually and progressively by the waves and yields progressively whereby the height and energy of the waves is progressively absorbed from one side to the other of said structure.

7. A breakwater structure comprising a multiplicity of individual hollow units of open construction each having an interior space bounded by similar normally vertical side wall-forming members which are arranged to afford said units with similar triangular shapes, respectively, in horizontal plan view, said units being arranged in a horizontal pattern of several units in width and length and with the apicies of adjacent units disposed in direct contact in such manner as to define between each set of adjacent units a space of triangular shape in horizontal plan view, means joining the adjacent units at said contacting apicies thereof to form said structure in such manner as to permit relative vertical angular movement of adjacent units, said wall-forming members having restricted passage means therethrough communicating said interior spaces of adjacent units through the intervening space between the respective adjacent units, whereby said passage means and spaces define a maze of tortuous interconnecting passages extending horizontally throughout said structure, and each unit being open at its top and bottom.

References Cited by the Examiner

UNITED STATES PATENTS

| | | | |
|---|---|---|---|
| 2,388,171 | 10/1945 | McVitty | 61—1 X |
| 2,658,350 | 11/1953 | Magill | 61—5 |
| 2,920,846 | 1/1960 | Lingafelter. | |
| 2,972,233 | 2/1961 | Askevold | 61—5 |
| 3,029,606 | 4/1962 | Olsen | 61—5 |

FOREIGN PATENTS 1,015  1875  Great Britain.

EARL J. WITMER, *Primary Examiner.*